United States Patent
Feight et al.

[15] 3,638,669
[45] Feb. 1, 1972

[54] CANTILEVERED BREAKAWAY FUEL AND OXIDIZER RELEASE

[72] Inventors: Robert A. Feight, Canoga Park; De Lacy F. Ferris, Van Nuys; Frank B. Hunter, Woodland Hills, all of Calif.

[73] Assignee: The United States of America as represented by the Secretary of the Navy

[22] Filed: May 22, 1970

[21] Appl. No.: 39,839

[52] U.S. Cl. .............................. 137/68, 60/39.48, 60/259
[51] Int. Cl. ................................. F02c 7/26, F16k 17/40
[58] Field of Search ............... 137/68; 60/258, 259, 39.48

[56] References Cited

UNITED STATES PATENTS

| | | | |
|---|---|---|---|
| 3,430,442 | 3/1969 | Rabe et al. | 137/68 X |
| 2,402,826 | 6/1946 | Lubbock | 137/68 X |
| 3,202,162 | 8/1965 | Eckardt et al. | 137/68 |
| 3,478,760 | 11/1969 | Hosek | 137/68 |

Primary Examiner—M. Cary Nelson
Assistant Examiner—Richard Gerard
Attorney—Richard S. Sciascia, Q. Baxter Warner and Gayward N. Mann

[57] ABSTRACT

A normally closed propellant isolation valve utilized in a missile propulsion system is actuated by propellant tank pressure to rupture a diaphragm and allow pressurized gas to flow into a cavity between two opposed pistons which are joined by a frangible tie. When the cavity pressure reaches a predetermined level, the tie fractures and allows the pistons to separate. Each piston then strikes and breaks an adjacent cantilever cup to simultaneously open oxidizer and fuel orifices. Each piston also moves its cup out of the flow path, thereby eliminating the effect of any pressure drop variation on the system mixture ratio.

7 Claims, 3 Drawing Figures

PATENTED FEB 1 1972
3,638,669
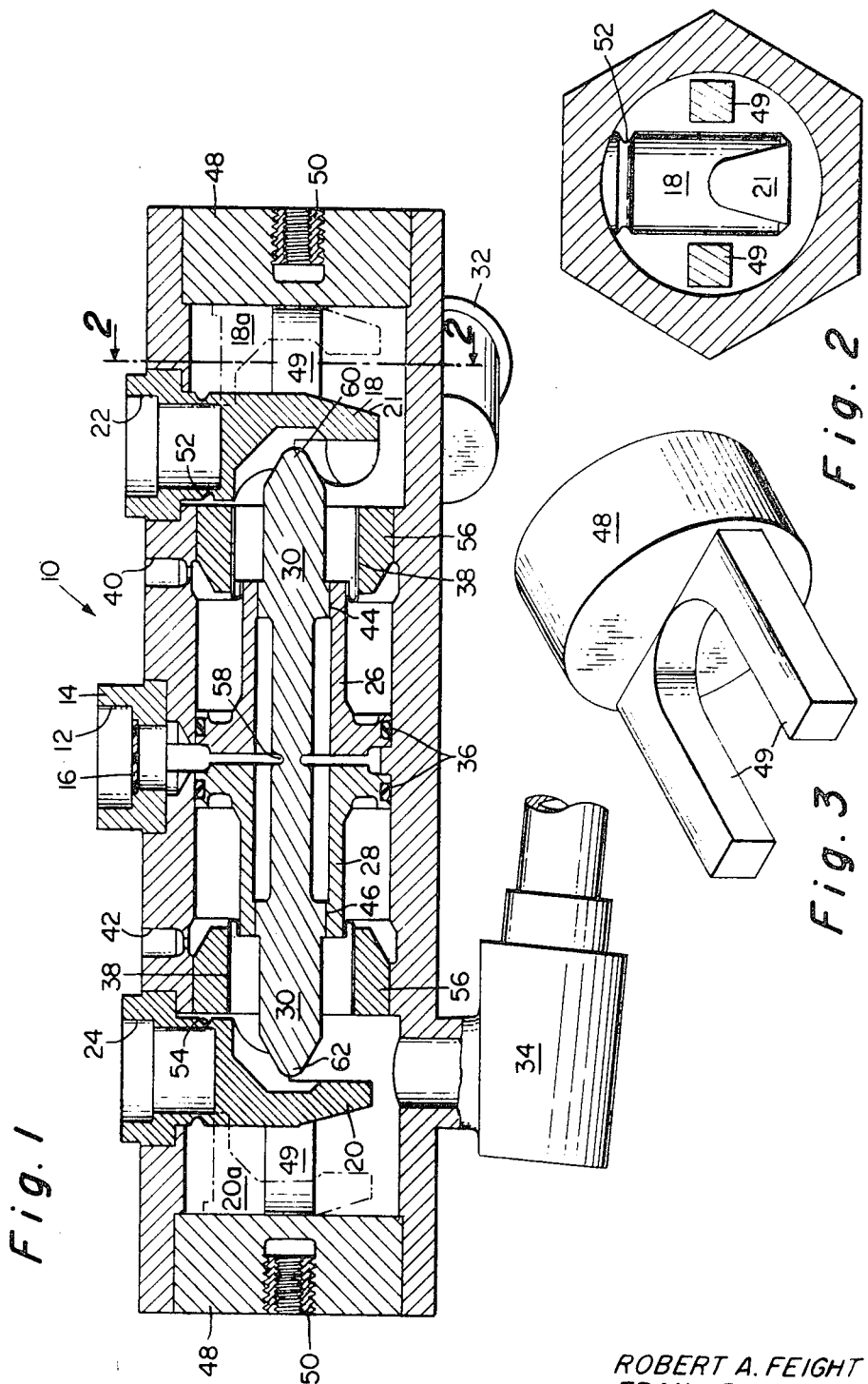
ROBERT A. FEIGHT
FRANK B. HUNTER
DE LACY F. FERRIS
INVENTORS
BY Dayward N. Mann
   O. Baxter Warren
   ATTORNEYS 3,638,669

CANTILEVERED BREADAWAY FUEL AND OXIDIZER RELEASE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to valve assemblies, and more particularly to a mechanism for simultaneous opening of both oxidizer and fuel passages in a missile propulsion system.

2. Description of the Prior Art

Numerous devices have been employed in the prior art for controlling the flow of fluids through passageways, such as oxidizer or fuel lines in rocket propulsion systems. One such device is shown in U.S. Pat. No. 2,402,826 which issued to Isaac Lubbock. That device employs rupturable diaphragms in fuel, oxidizer and water lines. Another device for feeding reagents to the mixing chamber of a rocket is shown in U.S. Pat. No. 2,671,312 which issued to Maurice Roy. A series of rupturable disks are positioned in several conduits to control the flow of liquid reagents to a mixing chamber where they are capable of reacting with each other to form a gas at elevated pressure. Still another device utilizing a different structural arrangement to block propellant orifices in a rocket motor arrangement is illustrated in U.S. Pat. No. 3,230,703. Propellant injection orifices are sealed by shear cups, but, when an igniter is fired, sufficient gas pressure is built up to force the propellant container against a shear slide which ruptures the shear cups. The propellants are then ejected into the thrust chamber where reaction occurs.

An inherent disadvantage in many rocket fuel and oxidizer release systems as exemplified by the prior art is the apparent inability of such systems to function predictably. Valuable experiments may thus be delayed, with consequent loss in scientific information and vastly increased financial expenditures.

SUMMARY OF THE INVENTION

The present invention comprises a propellant isolation valve which is normally closed but may be actuated by a given propellant tank pressure, say about 750 p.s.i.g. A diaphragm then ruptures and allows pressurization gas to flow within a piston cavity in which two pistons are joined in opposed relationship by a frangible tie. When the cavity pressure reaches a predetermined level (about 500 p.s.i.g.) the tie ruptures and allows the pistons to strike and break two cantilever cups which respectively seal the oxidizer and fuel orifices within the valve. The pistons will then move the cups out of the flow path and thus eliminate the effect of any pressure drop variations on the system mixture ratio.

STATEMENT OF THE OBJECTS OF THE INVENTION

An object of the present invention is to provide means of positively separating the propellants from the feed lines to ensure personnel safety during handling and storage operations.

Another object is to provide means for preventing accidental mixture of the propellants as a result of any pressure surges in the system.

Still another object is to provide means for effecting simultaneous opening of both the oxidizer and fuel passages at a specified tank pressure to ensure repeatable and controllable propellant priming and ignition transients.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a longitudinal sectional view of a valve embodying the principles of the present invention.

FIG. 2 is a cross-sectional view taken along a line substantially corresponding to line 2—2 of FIG. 1.

FIG. 3 is a perspective view of one of the end caps which close each end of the valve housing.

DESCRIPTION OF THE PREFERRED EMBODIMENTS

Referring now to the drawing, there is shown a valve housing 10 with an actuation gas inlet port 12 positioned in a boss 14 centrally mounted on the valve housing. Part 12 is connected to a valve actuation gas tank (not shown). A frangible diaphragm 16 is positioned in the boss and normally closes the inlet port 12 until ruptured by a predetermined start charge pressure. An oxidizer cantilever cup 18 and a similar fuel cantilever cup 20 are positioned in spaced relationship on either side of gas inlet port 12 and are designed to seal the oxidizer inlet port 22 and fuel inlet port 24 located contiguous to the oxidizer and fuel cantilever cups 18 and 20, respectively.

A pair of opposed hollow pistons 26 and 28 are positioned in back to back relationship within the valve housing 10 and may be joined by a frangible tension tie 30 which protrudes into the interior of each hollow piston where attachment by welding or otherwise occurs at 44 and 46 respectively, substantially as shown in the drawing.

In operation: when the propellant tank pressure reaches a predetermined value, such as 750±50 p.s.i.g., diaphragm 16 in the gas inlet port 12 ruptures allowing pressurization gas to flow between the two pistons 26 –28. When the pressure reaches about 500 p.s.i., the tension tie 30 breaks at the groove shown and the pressure forces pistons 26 and 28 toward the oxidizer and fuel cantilever cups 18 and 20, respectively. The projecting portions of the tension tie impact these cups 18 and 20, breaking them off at notches 52–54 and moving them to the charge position 18a–20a and permitting oxidizer and fuel to flow through the valve housing 10 into the separated oxidizer outlet 32 and the fuel outlet 34. Gas pressure on the pistons is sealed during the stroke by O-rings 36.

After breaking the oxidizer and fuel cantilever cups 18 and 20, the pistons 26 and 28 force the cups out of the flow path. It will be noted that in addition to O-rings 36 propellant leakage is prevented by the rolling diaphragm seals 38 welded to the pistons 26 and 28 and to the rolling seal retainer rings 56 mounted in the valve housing 10.

Oxidizer and fuel vents 40 and 42 respectively are located in the valve housing 10 and serve as safety means by which any oxidizer or fuel may be removed in the unlikely event of a valve leakage.

The valve housing 10 is normally tubular in form and is closed at each end by the caps 48 (FIG. 3). Each cap is provided with spaced arms 49 between which the cantilever cup extends. These guide the cup during its displacement movement. In addition each cap 48 may be drilled and tapped to accept threaded steel inserts 50 to provide structural mounting capability.

Frangible diaphragm 16 may be welded into the gas inlet port 12 and designed to rupture at 750±50 p.s.i.g. actuation gas pressure over a temperature range of −45° to 170° F. This diaphragm isolates O-rings 36 from the start charge tank pressure during storage and handling so that ignition does not occur in the event of an oxidizer leak into the start charge tank.

The oxidizer and fuel cantilever cups 18 and 20 are provided with grooved or notched webs 52 and 54 respectively. These web notches insure breakage when impacted by the pistons and enhance correct positioning of the cups during valve actuation so as to prevent obstruction of the flow of oxidizer and fuel fluids. The grooves may be slanted as shown to improve movement during rupture of the seal effected thereby.

The tension tie 30 is centrally grooved with a notch 58 and may be designed to fail at 500 p.s.i.g. pressure. As stated previously the tie is positioned within the hollow pistons 26 and 28 and is attached to each piston at 44 and 46 respectively. The conically nosed ends 60 and 62 of the tension tie 30 form the structure that actually impacts on the oxidizer and cantilever cups 18 and 20. The tie also ensures simultaneous actuation of the oxidizer and fuel sides of the valve and prevents piston movement until actuation.

Obviously many modifications and variations of the present invention are possible in the light of the above teachings. It is therefore to be understood that within the scope of the appended claims the invention may be practiced otherwise than as specifically described.

I claim:

1. A propellant isolation valve actuated by propellant tank pressurization gas comprising:

a valve housing having a gas inlet port centrally positioned with spaced oxidizer and fuel ports located on opposite sides of said gas inlet port;

said housing also having spaced oxidizer and fuel outlet ports on opposite sides of the gas inlet port;

a frangible diaphragm located in said gas inlet port and designed to be ruptured by the tank pressurization gas;

a pair of frangible cantilever cups with one cup blocking the oxidizer port and the other cup blocking the fuel port;

piston means positioned in said valve housing and adapted to be actuated by tank pressurization gas after rupture of the burst diaphragm;

the piston means including a pair of opposed pistons joined in the inactive position by a frangible tension tie, said tie being broken by the tank pressurization gas;

said piston means designed to maintain separate oxidizer and fuel chambers within the valve and when actuated to simultaneously break the cantilever cups and thereby open the oxidizer and fuel ports in the valve housing.

2. The isolation valve as defined in claim 1 wherein:
the burst diaphragm is designed to rupture at 750±50 p.s.i.g. and the frangible tension tie breaks at 500 p.s.i.g.

3. The isolation valve as defined in claim 1 wherein:
the fuel and oxidizer cantilever cups are provided with notched webs to ensure that said cups are moved out of the fuel and oxidizer flow path when broken by the actuated piston means.

4. The isolation valve as defined in claim 1 wherein:
O-rings are positioned between the piston means and the valve housing and
rolling diaphragm seals are attached to the piston means and to the valve housing to prevent oxidizer and fuel leakage.

5. The isolation valve as defined in claim 1 wherein:
spaced oxidizer and fuel vents are located in the valve housing to provide adequate removal of oxidizer and fuel in the event of valve failure.

6. A propellant isolation valve actuated by propellant tank pressurization gas comprising:

a valve housing having a gas inlet port centrally positioned with spaced oxidizer and fuel ports located on opposite sides of said gas inlet port;

said housing also having spaced oxidizer and fuel outlet ports on opposite sides of the gas inlet port;

a frangible diaphragm located in said gas inlet port and designed to be ruptured by the tank pressurization gas;

a pair of frangible cantilever cups with one cup blocking the oxidizer port and the other cup blocking the fuel port;

piston means positioned in said valve housing and adapted to be actuated by tank pressurization gas after rupture of the burst diaphragm;

said piston means designed to maintain separate oxidizer and fuel chambers within the valve and when actuated to simultaneously break the cantilever cups and thereby open the oxidizer and fuel ports in the valve housing;

each end of said valve housing is closed by an end cup having spaced parallel arms extending within the valve housing, said arms adapted to guide the cantilever cup out of the flow path.

7. The isolation valve as defined by claim 6 wherein:
an insert is positioned in each end cap to provide the valve with structural mounting capability.

* * * * *